Dec. 10, 1929.  J. J. MOJONNIER ET AL  1,739,252
FILLING MACHINE
Filed July 29, 1927  3 Sheets-Sheet 1
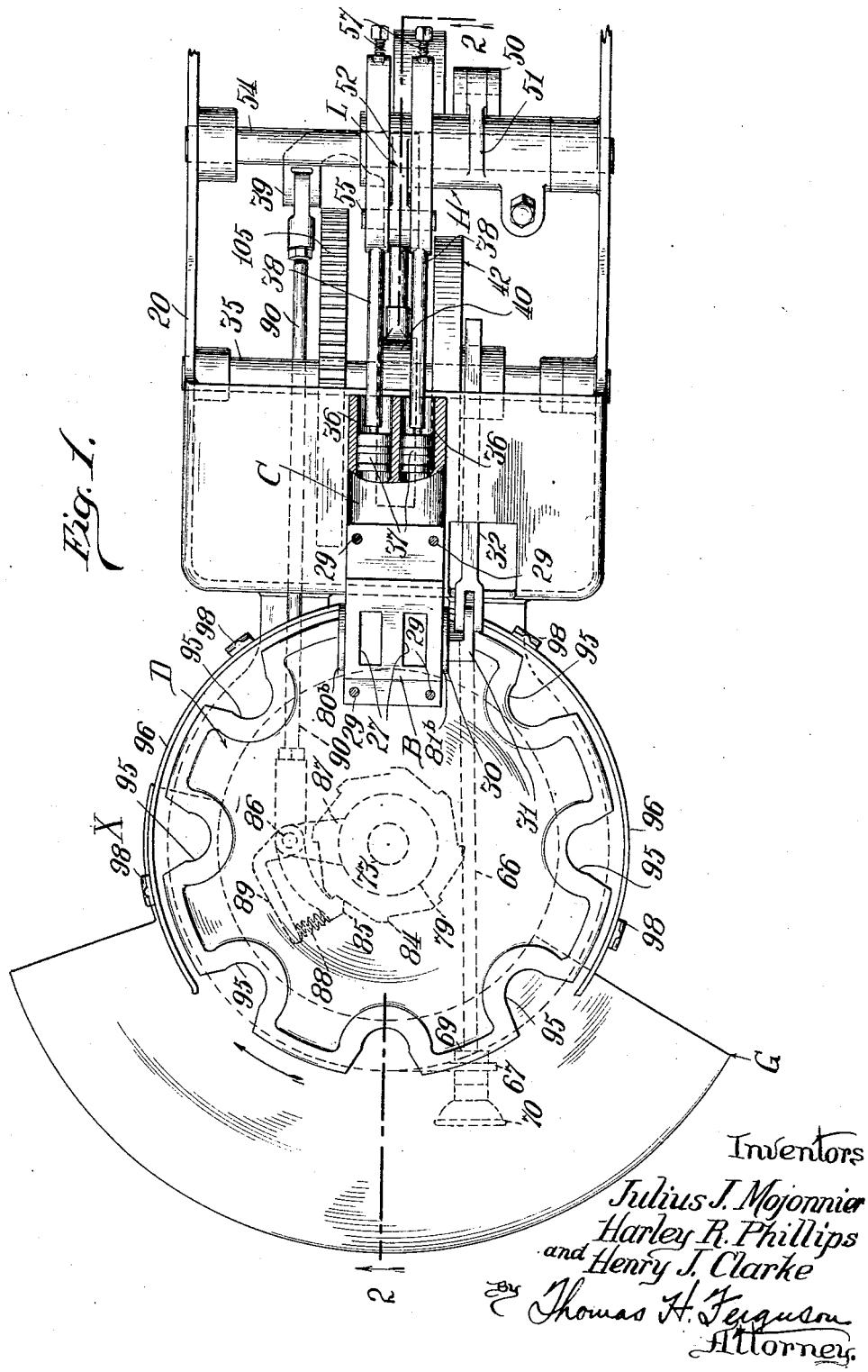
Inventors
Julius J. Mojonnier
Harley R. Phillips
and Henry J. Clarke
by Thomas H. Ferguson
Attorney.

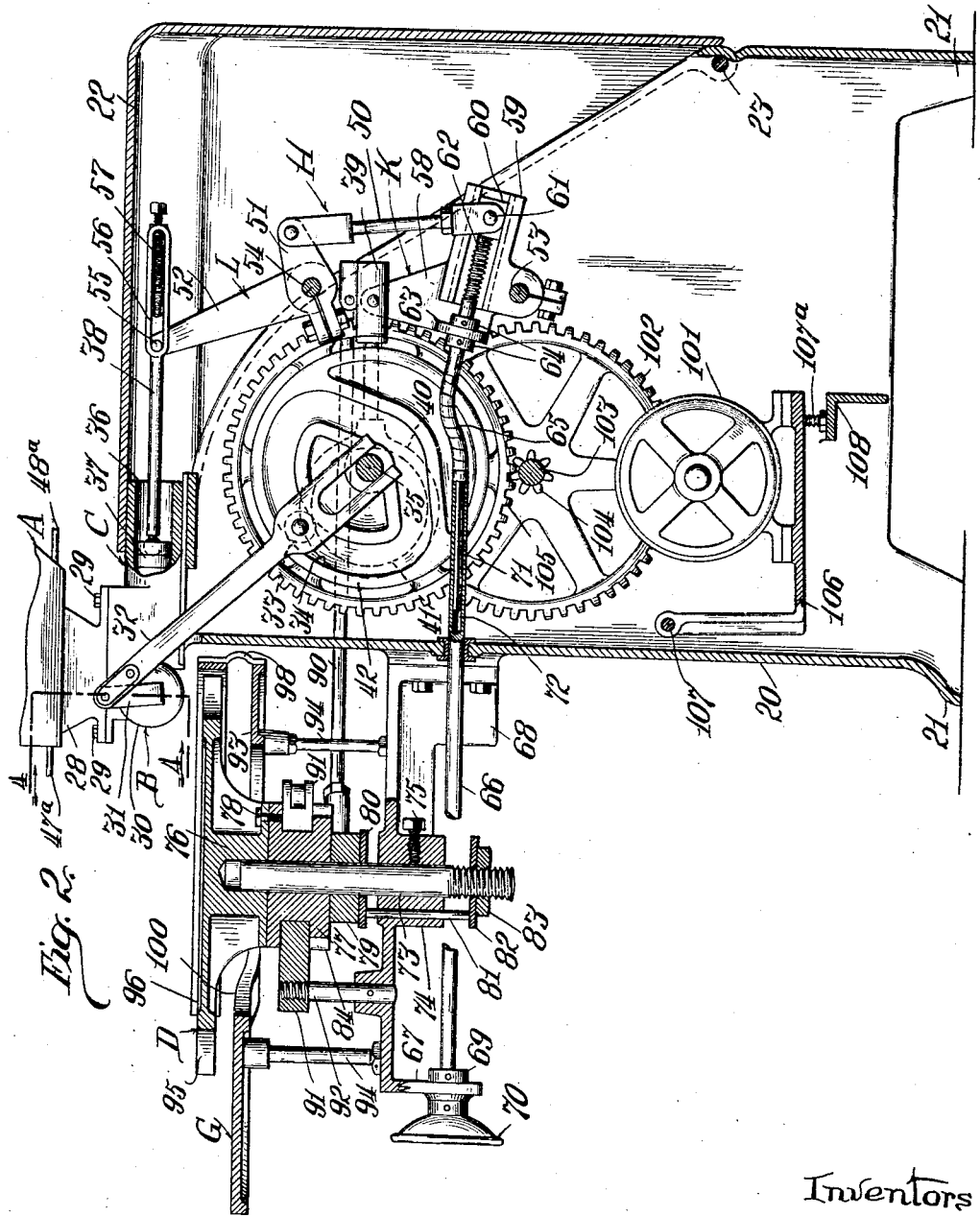

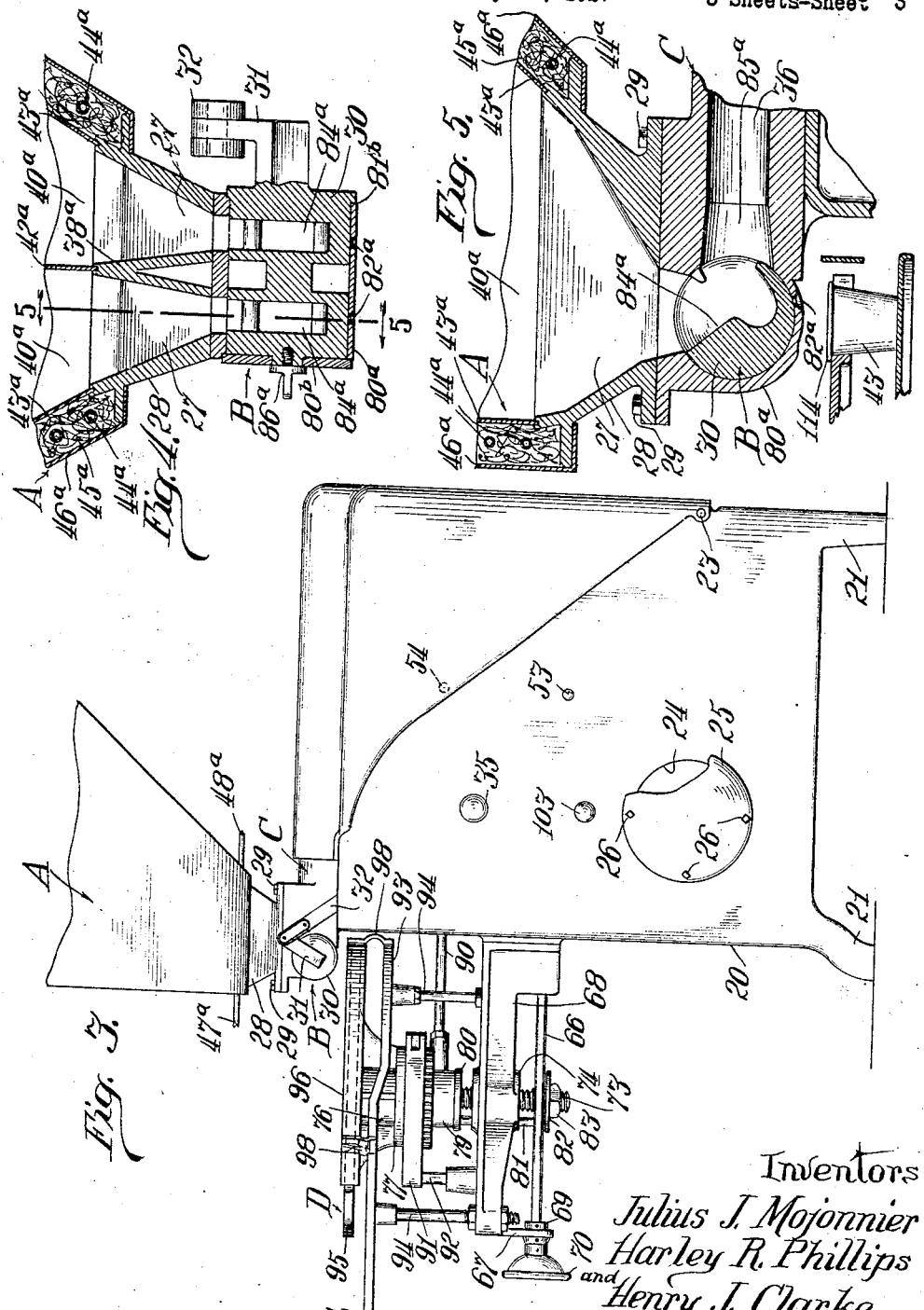

Patented Dec. 10, 1929

1,739,252

UNITED STATES PATENT OFFICE

JULIUS J. MOJONNIER AND HARLEY R. PHILLIPS, OF OAK PARK, AND HENRY J. CLARKE, OF CHICAGO, ILLINOIS, ASSIGNORS TO MOJONNIER BROS. CO., A CORPORATION OF ILLINOIS

FILLING MACHINE

Application filed July 29, 1927. Serial No. 209,228.

This invention relates to filling machines wherein relatively fragile containers of paper or other fibrous material are filled with ice creams, sherbets, water ices, pomades, pastes, and like plastic substances.

Recently there has developed a considerable trade in ice creams, water ices, and like edible commodities wherein a certain serving is given to the customer in a covered container, preferably a fragile container which may be destroyed after the customer has finished with it. In practice these containers are filled at the ice cream factory and placed in ice cooled tubs which are sent to the place of retailing. At the latter the containers are removed individually from the tubs and served to the customers.

The various features of the present invention are embodied in a machine devised more particularly for this class of service. They, however, need not be restricted to the filling of edible commodities, since the same are capable of application to other uses. However, in the present instance the features of the invention will be set forth as embodied in a machine for handling edible commodities.

The filling machine herein disclosed is along the lines of that shown in United States Patent No. 1,502,314, dated July 22, 1924, and is in the nature of an improvement on the same.

In brief, the machine disclosed herein comprises a conveyor for carrying the containers, a piston-type filler for supplying the commodity to the containers as they successively appear before it, and mechanism for intermittently advancing the conveyor and reciprocating the piston in proper timed relation one to the other.

The principal object of the invention is to provide novel mechanism for adjusting the filling charge. In the preferred construction the piston of the charge measuring cylinder is driven through lever and link mechanism and the connection of the parts are varied so as to change the stroke of the piston. This is done while the parts are in motion through a rotary adjusting rod and a flexible connection with the moving part of the mechanism. The rotary adjusting rod terminates near the forward edge of the conveyor in a position in which it may be readily rotated by an attendant standing before the conveyor and giving attention to the containers being fed to and taken from the conveyor.

Another object is to provide an arrangement of parts which will promote economy of manufacture, accessibility for replacement and repair, and efficiency in operation.

The several features of the invention with their advantages will be more fully understood upon reference to the following detailed description taken in connection with the accompanying drawings, while the scope of the invention will be particularly pointed out in the appended claims.

In said drawings, Fig. 1 is a plan view of a filling machine constructed in accordance with the present invention, the supply hopper being omitted for clearness; Fig. 2 is a vertical section of the machine taken on a plane indicated by the line 2—2 of Fig. 1, certain parts being shown in elevation; Fig. 3 is a side elevation of the machine; Fig. 4 is a vertical section through the valve and the parts immediately above it, the plane of section being indicated by the line 4—4 of Fig. 2; and Fig. 5 is a vertical longitudinal section through one of the measuring cylinders, the associated valve and nearby parts, the plane of section being indicated by the line 5—5 of Fig. 4. Throughout these views like characters refer to like parts.

In general, the machine illustrated in the drawings comprises a main hopper A for holding the supply of the commodity to be filled into the containers, a valve B by which the commodity is led from the hopper to the cylinder or cylinders and then from the latter to the containers, C the cylinder block whether containing one or more cylinders, D the rotary conveying member which carries the containers to and from the filling position, and G a receiving table upon which the filled and closed containers are delivered for subsequent removal by an attendant.

Referring to the drawings in detail, it will be seen that these various parts are positioned upon a main frame 20, having a plurality of supporting legs 21. The frame 20 is provided with a cover 22 which is pivoted at the point 23 to the frame 20. The frame 20 and its cover 22 forms a box like structure which is in reality a casing for the motor, gearing, and other movable parts of the machine. By turning back the cover 22 access may be had to the various parts enclosed in the casing. Obviously, other openings may be provided such as the hand hole 24, shown more particularly in Fig. 3. This may be closed by a suitable hand hole cover 25. Bolts 26 with the usual nuts may be used for this purpose.

The hopper A is located, as is usual in machines of this class, directly above the valve B. It may be practically the same in construction as the hopper shown in the aforesaid Patent No. 1,502,314. In this instance, however, it has different dimensions and is provided with a single partition so as to take care of two flavors of ice cream, if that be the commodity handled. It comprises a bottom 28 which is in the form of a casting having two outlets 27 with an intervening partition $38^a$ having inclined walls for the guidance of the commodity from the compartments $40^a$ to the outlets 27. A partition $42^a$ extends from the top of the partition $38^a$ to the top of the hopper. It is important that the hopper be suitably cooled so that the overrun of the frozen commodity shall not be reduced, in case such a commodity is the one being handled by the machine. For this purpose we surround the inner walls $43^a$ by brine coils $44^a$. The latter are surrounded by insulation $45^a$. The outer walls $46^a$ protect the coils and insulation. Suitable tubular connections to the coils $44^a$ are provided at desired points, such as $47^a$ and $48^a$. The hopper bottom 28 is secured to the cylinder block C by any suitable means, such as the screw bolts 29. The bottom member constitutes a connection for supplying the commodity to the valve and cylinders.

The valve B comprises a rotary member 30 which fits into a bore extending crosswise of the forward end of the cylinder block C. The member 30 is provided with suitable passages which cooperate with passages in the cylinder block to guide the material from the hopper A to the cylinders in one position of the valve, and from the cylinders to a discharge point directly beneath the valve in the alternate position of the valve. The arrangement is similar to that shown by the valve of patent to Geyer No. 1,401,150, dated December 27, 1921. The bored out end of the block C provides a valve casing $80^a$. This casing has two openings $82^a$ at its under side which correspond to the openings 27 and the cooperating passages in the valve. They are just above the table D in line with the recesses therein which receive the containers. The rotary element 30 is provided with a series of passages $84^a$ which are shaped more particularly as shown in Fig. 5. In one position of the member 30 the passages $84^a$ open communication between hopper outlets 27 and the cylinder openings $85^a$. In the alternate position of the member 30 communication is established between cylinder openings $85^a$ and the discharge outlets $82^a$. The rotary member 30 is held in place in casing $80^a$ by a disk $80^b$ and thumb screw $86^a$. The disk $80^b$ is of slightly greater diameter than the main portion of the member 30 and thus provides a bearing shoulder at one end of the valve. The opposite end of the member 30 is provided with a similar shoulder $81^b$. The two shoulders bear against opposite ends of the casing $80^a$ and allow the member 30 to be rotated the necessary distances. With this construction it is only necessary to unscrew the thumb screw $86^a$ and then the entire valve member 30 may be readily removed from the casing $80^a$ for cleaning the parts. The end of the member 30 distant from the thumb screw $86^a$ is provided with a crank arm 31 which is connected at its outer end with an actuating rod 32, driven through the agency of a cam roller 33 and cam track 34 upon the cam member 42 keyed to the cam shaft 35 journaled in the side walls of the main frame 20, as clearly illustrated in Fig. 1. The rod 32 is bifurcated at the cam end and the bifurcations straddle the shaft 35 and in this way the rod 32 is guided in its reciprocations. The cam member 42 is provided on one side with the cam 34 and on the opposite side with an eccentric 41. The cam track 34, as clearly shown in Fig. 2, is a depressed track.

The cylinder block C is bored out to provide, in the present instance, two cylinders 36. In each of these is a piston 37 having a piston rod 38. For the purpose of actuating the piston rods 38 we employ lever and link mechanism H which acts between a reciprocating driving head 39 and the rods 38. The head 39 is provided with an eccentric band 40 shown in dotted lines in Fig. 2, and the latter encircles an eccentric 41, also shown in dotted lines in said Fig. 2. The eccentric 41 being mounted on cam member 42 rotates with cam shaft 35. As a result of this construction, the rotation of the eccentric 41 moves the driving member 39 to and fro. The reciprocating movements of the head 39 are communicated to a bell crank lever K which has its short arm connected by a link 50 with the short arm 51 of a second bell crank lever L, the long arm 52 of which is connected to the piston rods 38. It will be noted that each piston 37 is connected to its rod 38 by a ball and socket joint. Thus each piston is allowed to travel freely in a rectilinear direction while the outer ends of the piston rods travel in slightly arcuate paths, occasioned by their connection to the bell crank arm 52. The bell crank K is mounted for oscillation upon a transverse shaft 53 which is journaled at its ends in bearings in the side walls of the main frame 20. In like manner, the upper bell crank lever L is secured to a shaft 54 which is similarly journaled in the side walls of the frame 20. The upper end of the bell crank arm 52 is provided with a transverse pin 55 which extends into slots 56 formed in the outer ends of the piston rods 38. The pin 55 has a limited movement in the slots 56 regulated in each instance by an adjusting screw 57 which is threaded through a threaded opening in the outer end of the rod 38 in each instance. By means of these screws 57 the movement of the pistons 37 may be regulated with reference to the throw of the crank arm 52. In this way the extent of the lost motion provided by the pin 55 and slots 56, constituting a lost motion connection between the piston rods 38 and the driving member 52, may be varied. Furthermore, by having two adjusting screws 57 it is possible to vary the volumes of the charges delivered by a plurality of cylinders. For example, a large volume may be provided for a sherbet and a small one for ice cream, the two being deposited in the one container. These are adjustments which will be made when the parts are at rest.

The bell crank levers K and L and the link 50 and their associated parts constitute articulated mechanical connections between the driving head 39 and the pistons 37. The bell crank lever K includes a member 58 which constitutes the long arm of the bell crank. This member is secured at its upper end to the reciprocating head 39. At its lower end it is provided with a slotted head or guideway 59 in which an adjusting block 60 may be moved. The lower end of the link 50, which connects the two bell crank levers, is journaled on a pin 61 which extends outward from the block 60. By means of the adjustable block 60 it is possible to vary the length of the short arm of the bell crank lever, that length being the distance between centers of the pin 61 and the shaft 53. By this adjustment the throw given to the arm 52 and the piston rods 38 may be varied.

The adjustment of the block 60 along the guideway of the head 59 should preferably be accomplished while the machine is in operation. We have devised a novel arrangement for this purpose. Thus, we provide a threaded bore through the block 60 and into this bore extend a screw 62 which is journaled for rotation in a lug 63 formed on the longer bell crank member 58. Collars 64 fixed to the screw 62 on opposite sides of the lug 63 hold the screw against longitudinal movement. In order to turn the screw 62 while the parts are in motion we preferably connect the forward end of the screw to a piece of flexible shafting 65. The other end of this shafting is telescopically connected to the rear end of a rotary adjusting rod 66 which is journaled in bearings in the forward wall of the casing 20 and in a downward projection 67 from the forward end of a bracket 68 upon the forward wall of the casing 20. A collar 69 is secured to the rod 66 and cooperates with the hub of the hand wheel 70 to prevent longitudinal movement of the rod 66 while leaving it free to rotate. It will be seen that with this construction it is possible by turning the hand wheel 70 to rotate the screw 62 and thus move the block 60 along the slotted guideway in the head 59 and thus vary the length of the short arm of the bell crank lever K. Thus a means for adjusting the throw of the pistons 37 while the machine is in operation is provided. The telescopic connection between the rod 66 and the flexible shaft 65 is provided by securing the forward end of the flexible shaft to a square rod 71 which enters a square bore 72 in the rear end of the adjusting rod 66. The connection furnished by these parts allows the bell crank K to be oscillated to and fro without at any time interfering with the control of the rod 66 over the screw 62. The hand wheel 70 on the forward end of the adjusting rod 66 is near the forward edge of the conveyor D in such position that it can be readily rotated by an attendant who is at the front of the machine giving attention to the containers being fed, filled and delivered.

It will be seen from the description thus far given that each to and fro movement of the driving head 39 produces a to and fro movement of the pistons 37. Such movement corresponds to one rotation of the cam shaft 35. The same rotation causes the valve B to move to its alternate position. This means that as the pistons 37 recede, the valve B is in position to guide charges of the commodity into the cylinders. The action of the pistons is to draw in charges of the commodity thus available. The return movement of the pistons to discharge the commodity from the cylinders does not occur until after the valve B has been thrown to its discharge position.

The rotary conveying member D is mounted for rotation upon the upper end of a fixed vertical shaft 73 which is firmly secured in a boss 74 in the bracket 68 by any suitable means such as the set screw 75. The table D is provided at its center with a hub 76 which is secured to a braking drum 77 by any suitable means such as one or more screws 78. The drum 77 in turn rests upon a rocking member 79. The parts 76, 77 and 79 are mounted for rotation upon the shaft 73. They may be adjusted vertically through the agency of a plate or washer 80 which bears against the under side of the member 79. This plate 80 is provided with two or more rods 81 which extend down through openings in the boss 74 of the bracket 68. The lower ends of these rods 81 engage the upper face of a plate or washer 82 which also surrounds the shaft 73. A nut 83 may be screwed up or down upon the end of the shaft 73 to shift the plate 82 and thereby through the pins 81 shift the plate 80. The latter will in turn raise the parts above it or allow them to descend according to the movements of the nut 83. The means thus provided constitutes an adjusting means for the table D by which it may be raised or lowered. The lower part of the braking drum 77 constitutes a ratchet wheel for rotating the table D. Its teeth 84 cooperate with a driving pawl 85 which is pivotally mounted upon a pin 86 at the outer end of the arm 87 of the rocking member 79. The free end of the pawl 85 is normally pressed into tooth engaging position by a spring 88 which bears between it and a fixed arm 89 carried by the arm 87. The pin 86 which carries the pawl 85 is secured to the forward end of an actuating rod 90 which is pivotally secured at its rear end to the reciprocating head 39. With this construction the reciprocations of the head 39 cause the driving pawl 58 to advance and recede, each time stepping the table D forward one step. This step by step mechanism for advancing the table D is practically the same as that disclosed in the aforesaid Patent No. 1,502,314, and need not be described or illustrated in more detail. The same is also true of the braking mechanism by which the table D is kept from advancing more than one step each time the pawl 85 is reciprocated. This braking mechanism places a drag on the table D and prevents its overstepping. For this purpose the drum 77 is provided with a brake band 91 which bears upon the periphery of the drum 77. At one point the brake band 91 is fixed to an upright pin 92 projecting upward from the bracket 68 to which it is fixed.

Beneath the rotary table D is a peripheral plate 93 which is widened out at the forward side of the machine to form the table G. The plate 93 is supported at a plurality of points by legs or rods 94 which are secured to the under side of the plate 93 and table G on the one hand, and on the other hand to the top of the bracket 68. The outer edge of the table D is provided with a series of recesses 95. These are made large enough to fit around a considerable portion of the periphery of the containers that are to be used on the machine. Such containers are generally designated 43 in the drawings. The portion of the table D adjacent to the recesses 95 is thickened so as to provide a substantial wall for the containers 43 to rest against. In order to keep the containers in snug engagement with the walls of the recesses 95, while they are passing from the feeding point to the delivery point, we provide a peripheral guard 96. This guard is supported from the plate 93 by suitable uprights 98. After passing beyond the guard, the containers are free to move out of the recesses 95 on to the table G. As clearly shown at the point 100 in Fig. 2, the plate 93 merges into the table G by an upward bend. Since the bottoms of the containers slide along the plate 93 as they travel under the impetus of the table D, it will be seen that this high elevation of the table G tends to lift them upward with reference to the engaging walls of the recesses and thus to free them for outward movement upon the surface of the table G as the conveying member D continues its rotation.

The cam shaft 35 is connected by a train of gearing with a driving motor 101. A pinion on the latter engages a large gear wheel 102 which is mounted on a transverse shaft 103, having bearings at its opposite ends in the side walls of the casing 20. A pinion 104 movable with the gear wheel 102 engages a gear wheel 105 which is keyed directly to the cam shaft 35. By this gearing, the speed of the motor 101 is properly reduced to that required for the cam shaft 35. The motor 101 is preferably mounted for adjustment upon a table 106 which is carried by a pivot pin 107 suitably supported by the walls of the casing 20. The free end of the table 106 is vertically adjustable by one or more adjusting screws 107$^a$ which extend through the horizontal flange of a transverse angular member 108 carried by the casing 20. By this adjustment the teeth of the pinion of the motor are brought into proper engagement with the teeth on the gear wheel 102. This adjustment enables a ready assembly of motors of different makes in the production of a number of different filling machines. In this way variations in manufacture are readily taken care of.

The containers 43 are preferably in the form of cups having outwardly extending rims 114. The material of the cups is fragile, usually being paper waxed or otherwise treated so as to be impervious to the moisture of the commodity, whether it be a frozen diary product such as in ice cream, or an unfrozen moist substance. If desired, the containers, when once filled, may be closed by disks or covers. The feeding of the containers into the recesses or openings 95 may be accomplished in different ways. An automatic feeder for this purpose may be employed if desired. As far as the machine herein disclosed is concerned, the feeding must be done by hand. Where fed by hand the containers are dropped into the recesses 95 so as to rest between them and the guard 96 at some point, such as X of Fig. 1, prior to reaching the filling position at valve B. After being filled they are removed at a point beyond valve B. Ordinarily this is done after the filled cups have passed on to the table G. The filling may also be done by shoving the empty containers from table G into the recesses 95 and seeing that they properly pass in behind the guard 96. The table D travels in the direction of the arrow in Fig. 1. It will be seen that the spacing of the recesses 95 is such that while one recess occupies a cup-receiving position during a rest period, another recess will occupy a position at rest beneath the filling valve B. At the time a cup is in such filling position the valve B and cylinder pistons will be operated to deliver a charge of the commodity into the cup beneath the valve. In the present instance two flavors may be simultaneously deposited in each container. Of course by filling both compartments of the hopper with the same commodity, each filling would consist of but one commodity, instead of two. After removal from table G, filled containers are taken to a hardening room where the balance of the freezing takes place, in case the machine is used in packaging a frozen commodity. Where this is not the case, the package may be removed from the table G and promptly packed for shipment.

In carrying out our invention, many alterations and modifications may be made in the particular structures illustrated without departing from the spirit and scope of the invention. We, therefore, do not wish to be limited to the exact construction shown, but aim to cover by the terms of the appended claims all those alterations and modifications which rightly come within the scope and purview of the invention.

What we claim as new and desire to secure by a patent of the United States is:

1. A machine of the class described comprising a commodity supply connection, a cylinder, a valve operative in one position to guide the commodity from said supply connection to said cylinder and in a second position to guide the commodity from said cylinder to a delivery point, a piston and piston rod for said cylinder, a reciprocating driving head, means for actuating said valve in timed relation with said driving head, an auxiliary driving member having a lost motion connection with said piston rod, means for varying the extent of the lost motion in said connection, articulated mechanical connections between said driving head and said auxiliary driving member operative to drive the latter from the former, and means for shifting said connections at a joint thereof to change their relative movements and consequently the extent of movement of said auxiliary driving member.

2. A machine of the class described including a commodity supply connection, a cylinder, a valve operative in one position to guide the commodity from said supply to said cylinder and in a second position to guide the commodity from said cylinder to a delivery point, a piston and piston rod for said cylinder, a reciprocating driving head, means for actuating said valve in timed relation with said driving head, two bell crank levers connected one to said driving head and the other by a lost motion connection to said piston rod, means for varying the extent of the lost motion in said connection, a link connecting said bell crank levers, and means for shifting the connection between said link and one of said bell crank levers to change the throw of the bell crank lever having said lost motion connection.

3. A machine of the class described including a commodity supply connection; a cylinder; a valve operative in one position to guide the commodity from said supply to said cylinder and in a second position to guide the commodity from said cylinder to a delivery point; a piston and piston rod for said cylinder; a reciprocating driving head; means for actuating said valve in timed relation with said driving head; two bell crank levers connected one to said driving head and the other by a lost motion connection to said piston rod, the piston rod having a longitudinal slot and the associated lever arm having a pin movable in said slot to provide said lost motion connection; a screw threaded through the end of said piston rod into adjusting position in said slot to determine the extent of the lost motion of said lever arm pin; a link connecting said bell crank levers, one said link connection comprising a block slidable in a guideway formed in one of said bell crank levers; a screw for adjusting said block in said guideway; a rotary adjusting rod; fixed bearings for said rod; and a flexible transmission shaft connecting said rod and screw whereby rotations of said rod will adjust said sliding block and thus vary the throw of the bell crank lever having said lost motion connection.

4. A machine of the class described including a horizontal conveyor, a measuring cylinder rearward of and above the level of said conveyor, a commodity supply connection, a valve beneath said connection operative in alternate positions to guide the commodity to the cylinder from said connection and from the cylinder to containers on said conveyor, a piston for said cylinder, a reciprocating driving head, means for operating said valve in timed relation with said head, an auxiliary driving member having an adjustable lost motion connection with the rear of said piston rod, articulated mechanical connections between said driving head and auxiliary driving member operative to drive the latter from the former, means for shifting said connections at a point thereof to change their relative movements and consequently the extent of travel of said auxiliary driving member, a rotary adjusting rod extending forward to a point adjacent to said conveyor, and a flexible power-transmitting connection between the rear end of said rod and said connection-shifting means whereby an attendant before said conveyor may readily rotate said adjusting rod to vary the cylinder discharge.

5. A machine of the class described including a main supporting casing, a forwardly extending bracket secured thereto, a horizontal rotary conveying table carried by said bracket, a measuring cylinder just rearward of and above said table, a valve at the forward end of said cylinder, a commodity supplying connection for said valve, a piston in said cylinder, a piston rod extending rearwardly therefrom, a bell crank lever having one arm connected by a lost motion connection with the rear end of said piston rod, means for adjusting the extent of the lost motion in said connection, a reciprocating driving head within said casing, means for actuating said valve in timed relation with said driving head, a second bell crank lever having one arm connected to said driving head, a link connecting the other arms of said bell crank levers, means for shifting the connection between said link and said second bell crank lever, fixed bearings beneath said table, a rotary adjusting rod in said bearings extending to a point adjacent to the forward edge of said table, and a flexible power-transmitting connection between the rear end of said rod and said connection-shifting means whereby an attendant giving attention to said table and the containers on it may readily rotate said adjusting rod to alter the amount of commodity delivered in each charge to the containers on said table.

6. In a machine of the class described including a horizontal conveyor, a measuring cylinder rearward of and above the level of said conveyor, a commodity supply connection, a valve beneath said connection operative in one position to guide the commodity to said cylinder from said connection and in a second position to guide the commodity from said cylinder to containers on said conveyor, a piston and piston rod for said cylinder, a reciprocating driving head, means for operating said valve in timed relation with said head, articulated mechanical connections between said driving head and said piston rod operative to drive the latter from the former, means for shifting said connections at a point thereof to change their relative movements and consequently the extent of travel of said piston, a rotary adjusting rod extending forward to a point near the forward edge of said conveyor, and a flexible power-transmitting connection between the rear end of said rod and said connection-shifting means whereby an attendant before said conveyor may readily rotate said adjusting rod to vary the cylinder discharge.

7. In a machine of the class described including a main supporting casing, a forwardly extending bracket secured thereto, a horizontal rotary conveying table carried by said bracket, a measuring cylinder just rearward of and above said table, a valve at the forward end of said cylinder, a commodity supplying connection for said valve, a piston and piston rod for said cylinder, a reciprocating driving head within said casing, means for actuating said valve in timed relation with said driving head, two bell crank levers one connected to said piston rod and the other to said driving head, a link connecting said bell crank levers, means for shifting the connection between said link and one of said bell crank levers to vary the throw of the driven bell crank lever, fixed bearings beneath said table, a rotary adjusting rod journaled in said bearings extending forward to the forward edge of said table, and a flexible power-transmitting connection between the rear end of said rod and said connection-shifting means whereby an attendant before said table giving attention to the same and the containers thereon may readily rotate said rod to alter the cylinder discharge.

8. A machine of the class described including commodity supply connections, a plurality of cylinders, valve means operative in one position to guide the commodity from said supply connections in separate streams to said cylinders and in a second position to guide the commodity in like separate streams from said cylinders to a delivery point, pistons and piston rods for said cylinders, a reciprocating driving head, means for actuating said valve means in timed relation with said driving head, an auxiliary driving member common to said piston rods having a lost motion connection with each of said piston rods, separate means for varying the extent of the lost motion in each of said lost motion connections, and articulated mechanical connections between said driving head and said auxiliary driving member operative to drive the latter from the former.

9. A machine of the class described including commodity supply connections, a plurality of cylinders, valve means operative in one position to guide the commodity from said supply connections in separate streams to said cylinders and in a second position to guide the commodity in like separate streams from said cylinders to a delivery point, pistons and piston rods for said cylinders, a reciprocating driving head, means for actuating said valve means in timed relation with said driving head, an auxiliary driving member common to said piston rods, a connecting pin in said auxiliary member extending through longitudinal slots in the ends of said piston rods, and screws threaded through the ends of said piston rods and extending lengthwise into their respective slots to provide an adjustable lost motion connection between said auxiliary member and each of said piston rods, and articulated mechanical connections between said driving head and said auxiliary member operative to drive the latter from the former.

In witness whereof, we have hereunto affixed our signatures this 27th day of July, 1927.

JULIUS J. MOJONNIER.
  HARLEY R. PHILLIPS.
  HENRY J. CLARKE.

CERTIFICATE OF CORRECTION.

Patent No. 1,739,252. Granted December 10, 1929, to

JULIUS J. MOJONNIER ET AL.

It is hereby certified that error appears in the printed specification of the above numbered patent requiring correction as follows: Page 1, line 44, for the word "connection" read "connections"; page 5, line 123, claim 4, for the word "point" read "joint"; and that the said Letters Patent should be read with these corrections therein that the same may conform to the record of the case in the Patent Office.

Signed and sealed this 4th day of February, A. D. 1930.

(Seal)

M. J. Moore,
Acting Commissioner of Patents.